Nov. 27, 1956
J. BARRATT
2,771,652
SNAP FASTENER SOCKET
Filed April 24, 1953
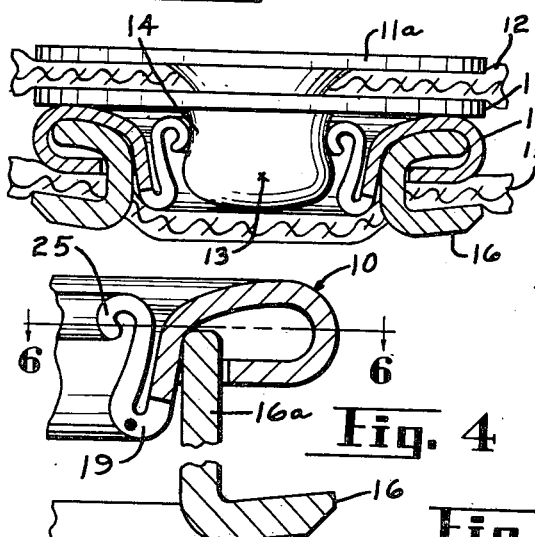
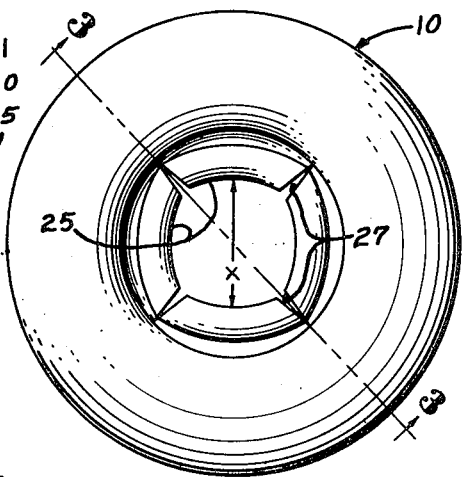
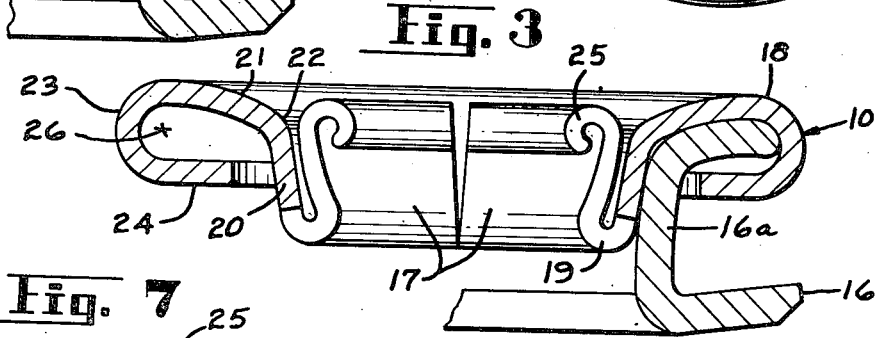
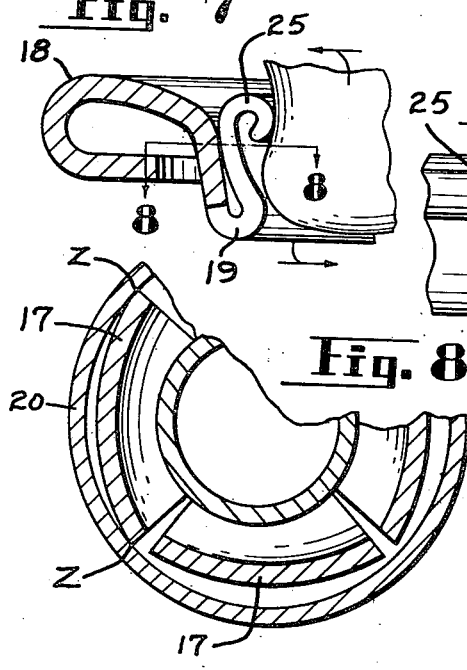
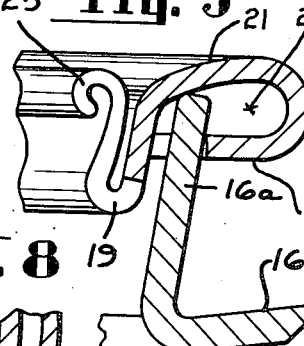
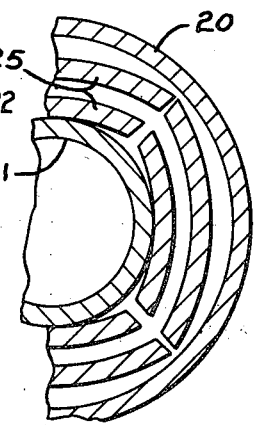
INVENTOR
Jesse Barratt
BY
H. F. Johnston
ATTORNEY

United States Patent Office 2,771,652
Patented Nov. 27, 1956

2,771,652
SNAP FASTENER SOCKET

Jesse Barratt, Naugatuck, Conn., assignor to Scovill Manufacturing Company, Waterbury, Conn., a specially chartered corporation of Connecticut Application April 24, 1953, Serial No. 350,873

1 Claim. (Cl. 24—216)

This invention is an improved snap fastener socket member for use in that type of snap fastener combination which is commonly referred to as a laundry-proof snap fastener.

Although laundry-proof snap fasteners have come into wide use since the invention of the socket member shown in Fenton Patent No. 2,106,728 they have always been found wanting in certain respects especially when their use has been extended to garments where the fasteners might be subject to considerable lateral stress. This was due mainly to the distortion of the spring fingers of the socket member beyond their elastic limits after which the stud and socket would not snap together properly.

Attempts to meet this problem are exemplified by patents to Dews, No. 2,129,825, and Fenton, No. 2,371,813. In those cases an extra member was provided as "armor" which added so much to the bulk and expense of the fastener that it found only a limited field of application. The need was obviously for a snap fastener socket of the so-called one-piece type which could be manufactured inexpensively in a single machine and without requiring assembling operations. It may be noted here that "one-piece member" means one-piece aside from the prong ring which is used to attach it to a garment by insertion of the prongs through the garment material into clinching engagement with a breast portion surrounding the spring fingers of the socket member. The wall of the breast portion of such a socket member necessarily starts off with a lead-in angle for the prongs to take care of slight variations in the location of the prongs relative to the socket during the attaching operation. It must also curve outwardly so as to bend the prongs into engagement with the retaining ring. This has always required that the breast wall be so far away from the fingers that there was nothing to back them up so that they might be quite easily distorted when a strong lateral pull was placed on any one of the fingers by the stud.

After considerable experimentation I have discovered by a novel combination of features, any one of which by itself would be of little or no value, I am able to produce an improved one-piece socket member which satisfies this need.

By a novel shape of the breast portion I provide the desired entrance angle for the prongs in the form of a conical wall which extends in about a straight line upwardly to the region of the ends of the spring fingers, in combination with a prong deflecting surface which extends in a broad arc as far as possible toward the periphery of the member where it joins the U-shaped retaining ring. The fingers themselves are biased outwardly and preferably bowed toward the adjacent breast wall and they terminate in rolled lips or beads which extend inwardly toward the axis of the socket so as to provide a point or tangent contact with the stud at their central portions while the side edges of the fingers, particularly in the region of the beads, are substantially farther away from the axis than the central portions. This combination of features results in allowing the side edges of the fingers in the region of the beads to be close enough to the adjacent breast wall so as to be backed up by that wall and prevent distortion of the fingers beyond their elastic limits.

Another objective is to provide an improved socket that can be manufactured cheaply without much variation of existing machines and with no additional raw material requirement.

In the accompanying drawings I have shown for purpose of illustration the preferred embodiment of my invention.

Fig. 1 is a sectional view of a snap fastener installation, including a conventional stud member engaged with my improved socket member.

Fig. 2 is a plan view of the socket member per se on a scale comparable to Fig. 1.

Fig. 3 is a sectional view of the socket member on an enlarged scale taken along line 3—3 of Fig. 2 and showing a portion of a prong ring in clinched position.

Fig. 4 is a partial section of a socket member similar to Fig. 3 but showing a part of a prong ring as it appears in aligned position to be clinched in the socket member.

Fig. 5 is a view similar to Fig. 4 but showing one of the prongs of the prong ring in its initial deformed state.

Fig. 6 is a transverse partial sectional view of the socket taken along line 6—6 of Fig. 4 and including a stud section.

Fig. 7 is a partial section of a socket associated with a stud head showing a state of lateral stress that may exist under service conditions, and Fig. 8 is a partial section taken along line 8—8 of Fig. 7.

For the purpose of illustrating the general assemblage of a snap fastener combination, I have shown in Fig. 1 of the drawing a socket member 10 and a stud 11 of the usual circular cross-section. The stud 11 is secured to a suitable support 12 such as a piece of fabric material in the usual manner as by a rivet post 11a. The stud 11 is formed with the usual enlarged head 13 and reduced neck 14, which head and neck are adapted to enter the socket 10 in coupling the parts together.

The socket member 10 is mounted upon a suitable support 15 by means of an attaching prong ring 16 of the character disclosed in the above referred to Fenton patent. As more clearly shown in Fig. 3 the socket member 10 comprises a series of resilient fingers 17 arranged around the stud-receiving opening within an annular breast portion 18 and are integrally joined thereto by U-shaped connections 19. The free ends of the fingers 17 terminate in inwardly rolled beads or lips 25 that define the stud-receiving opening. The breast portion 18 of my improved socket consists of portions of distinctly different formations, which are namely a conical lead-in wall 20, a prong-deflecting wall 21 of relatively large radius joined to the conical wall 20 by a relatively small or short curve 22 and terminating in an annular rim 23 of U-shape in cross section. The conical wall 20 slopes upwardly and outwardly from the connections 19 at approximately 10° to the central axis of the socket member 10 and extends in a straight line to a point in the region of the gripping beads 25. This lead-in angle of the conical wall 20 serves to centralize the prong ring 16 relative to the socket member in the clinching operation.

The prong-deflecting wall 21 extends in a broad arc upwardly and outwardly in the general direction of about 110° to the socket axis for the purpose of assuring that the prongs 16a will be properly deflected outwardly during the setting operation without danger of piercing through or otherwise marring said deflecting wall 21. The annular rim 23 terminates in a prong-retaining ring 24 which extends inwardly toward the conical wall 20 and provides for a hollow space 26 into which the prongs 16a of the prong ring may be clinched during the assembly of the socket 10 to the support 15.

In order to provide the desired amount of resiliency to the spring fingers 17 and obtain an easy off-and-on action for the stud, I prefer to use four individual fingers 17 separated by slits 27 extending the entire length of the fingers and into the U-shaped connections 19. As best seen in Fig. 3 the fingers 17 are inclined outwardly and are shown slightly bowed in their lengthwise direction and lie relatively close to the adjacent surface of the anvil beveled wall 20. As described above the fingers terminate in inwardly formed rolled beads or lips 25 and the distance between the opposed mid sections of the lips 25 is slightly less than the largest diameter of the stud head 13, this dimension being indicated by line X in Fig. 2. To assure that the finger lips 25 will have a tangent contact with the enlarged head portion 13 of the stud 11 when the socket 10 is assembled to and removed therefrom, the lips 25 and adjacent section of the fingers 17 are preferably formed on arcs that are eccentric to the center line of the socket 10. Thus the inturned lips 25 provide beads which are closer to the socket axis at their central portions and substantially farther from the axis at each side thereof. With such a formation of the fingers 17 and lips 25, the side edges of the fingers 17 adjacent their beaded or free ends lie sufficiently close to the surrounding conical wall 20 to cause the finger edges to contact thereagainst as indicated at the point Z in Fig. 8 when undue lateral stress occurs between the socket and stud as indicated by the opposed arrows in Fig. 7. The normal space between the finger edges and conical wall will be of the order of .004" to .008", whereby the conical wall serves to back up the fingers against springing beyond their elastic limits.

In assembling the prong ring 16 into the socket member 10 the conical wall 20 of the breast portion will serve to lead in the prongs 16a and centralize the prong ring relative to the socket. The prongs 16a will then be initially deflected by the upper portion of the conical wall 20 and the short curved portion 22 until they engage the inner edge of the retaining ring 24 as seen in Fig. 5. During this initial action the prongs 16a tend to bend about their points of connection with the ring. Further clinching pressure causes the ends of the prongs to be guided along the broad upwardly directed arc 21 and thus the prongs are deflected outwardly into the hollow space 26. Since the prongs cannot bend farther about their points of connection with the ring they tend to buckle inwardly during the final clinching action. The prongs are thus securely locked behind the retaining ring 24 of the socket member.

As a result of my invention it will be evident to those skilled in the art that the need which has long been apparent, for a one-piece socket member which will withstand the stresses likely to be met in actual use, is satisfied. Furthermore, this result has been accomplished by a socket member which though decidedly novel in shape can be cheaply manufactured in machines of the type commonly used in snap fastener factories. Thus the main causes of failure of laundry-proof snap fasteners has been eliminated and they can now be used on garments and other articles where the fasteners are likely to be subjected to considerable lateral stress, whereas prior attempts to produce a strong enough fastener involved additional bulk and expense which limited their field of use.

What I claim as my invention is:

In a laundry-proof snap fastener installation of the type having a socket member adapted for snap engagement with a stud member of circular cross section, which socket member is attachable to sheet-like supporting material by means of a pronged ring insertable through the material into engagement with said socket member; said socket member comprising a single piece of sheet metal shaped to provide a plurality of resilient fingers arranged around a central stud-receiving opening, the free ends of said fingers being turned radially inwardly to form stud-gripping beads, and a breast portion surrounding said fingers and having its inner lower edge integrally joined to said fingers, said breast portion comprising a conical wall sloping upwardly and outwardly at an angle of approximately 10° to the central axis of the socket member in a straight line up to the region of said gripping beads, said breast portion extending from such point around a short curve to a prong deflecting surface which extends in an arc of relatively large radius upwardly and outwardly in the general direction of about 110° to the central axis of the socket member and directly from said arc into a U-shaped annular rim the bottom portion of which extends inwardly toward said conical wall to provide a prong-retaining ring; said fingers extending upwardly from their points of connection with the breast portion in outwardly bowed fashion approximately parallel to said conical wall, the upper ends of the fingers terminating in rolled lips which turn inwardly toward the axis of the socket and downwardly and back so that their extreme edges are directed outwardly from the socket axis, said rolled lips providing the stud-engaging beads above referred to, said beads being closest to the socket axis at their central portions and substantially farther from the axis at each side thereof, and said beaded portions being in such close proximity to the adjacent breast wall that the side portions as distinguished from the central portions of one of the fingers will come to bear against said conical wall adjacent said short curve when undue lateral stress comes upon such finger with the result that any distortion of any of the spring fingers beyond the elastic limit is prevented by such engagement.

References Cited in the file of this patent

UNITED STATES PATENTS

| | | |
|---|---|---|
| 2,125,125 | Reiter | July 26, 1938 |
| 2,402,627 | Huelster | June 25, 1946 |
| 2,440,684 | Huelster | May 4, 1948 |